(12) United States Patent
Spertus et al.

(10) Patent No.: US 8,832,132 B1
(45) Date of Patent: Sep. 9, 2014

(54) PERSONALIZING SEARCH QUERIES BASED ON USER MEMBERSHIP IN SOCIAL NETWORK COMMUNITIES

(75) Inventors: Ellen Spertus, San Francisco, CA (US); Stephen R. Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 616 days.

(21) Appl. No.: 10/872,504

(22) Filed: Jun. 22, 2004

(51) Int. Cl.
*G06F 17/30* (2006.01)

(52) U.S. Cl.
USPC .......................................................... 707/765

(58) Field of Classification Search
USPC ................................................ 707/708, 767
See application file for complete search history.

(56) References Cited

U.S. PATENT DOCUMENTS

| | | | |
|---|---|---|---|
| 5,287,498 A | 2/1994 | Perelman et al. |
| 5,537,586 A | 7/1996 | Amram et al. |
| 5,796,393 A | 8/1998 | MacNaughton et al. |
| 5,950,200 A | 9/1999 | Sudai et al. |
| 5,963,951 A | 10/1999 | Collins |
| 6,041,311 A | 3/2000 | Chislenko et al. |
| 6,052,122 A | 4/2000 | Sutcliffe et al. |
| 6,061,681 A | 5/2000 | Collins |
| 6,073,105 A | 6/2000 | Sutcliffe et al. |
| 6,073,138 A | 6/2000 | de l'Etraz et al. |
| 6,092,049 A | 7/2000 | Chislenko et al. |
| 6,130,938 A | 10/2000 | Erb |
| 6,192,119 B1 | 2/2001 | Wilson |
| 6,327,590 B1 | 12/2001 | Chidlovskii |
| 6,366,962 B1 | 4/2002 | Teibel |
| 6,389,372 B1 | 5/2002 | Glance et al. |
| 6,421,678 B2 | 7/2002 | Smiga et al. |
| 6,442,567 B1 | 8/2002 | Retallick et al. |
| 6,526,440 B1 | 2/2003 | Bharat |
| 6,529,903 B2 | 3/2003 | Smith et al. |
| 6,594,673 B1 | 7/2003 | Smith et al. |
| 6,615,209 B1 | 9/2003 | Gomes et al. |
| 6,658,423 B1 | 12/2003 | Pugh et al. |
| 6,665,715 B1 | 12/2003 | Houri |
| 6,678,681 B1 | 1/2004 | Brin |
| 6,697,478 B1 | 2/2004 | Meldrum et al. |
| 6,725,259 B1 | 4/2004 | Bharat |
| 6,754,322 B1 | 6/2004 | Bushnell |
| 6,754,873 B1 | 6/2004 | Law et al. |
| 6,799,176 B1 | 9/2004 | Page |
| 6,834,195 B2 | 12/2004 | Brandenberg et al. |

(Continued)

FOREIGN PATENT DOCUMENTS

| | | |
|---|---|---|
| CN | 1949220 A | 4/2007 |
| EP | 1288795 A1 | 3/2003 |

(Continued)

OTHER PUBLICATIONS

U.S. Appl. No. 60/525,120, filed Nov. 2003, Flinn et al.*

(Continued)

*Primary Examiner* — Syed Hasan
(74) *Attorney, Agent, or Firm* — Patent Law Works LLP

(57) ABSTRACT

Methods and systems for improving user search experience with a search engine by providing a way for associated users to personalize search queries and/or search results based on users' information gathered from a social network. Search personalization can be achieved through the tailoring of search methodologies or the ranking or ordering of search results in accordance with information gathered for each user.

38 Claims, 8 Drawing Sheets

(56) References Cited

U.S. PATENT DOCUMENTS

| | | | |
|---|---|---|---|
| 6,837,436 B2 | 1/2005 | Swartz et al. | |
| 6,859,807 B1* | 2/2005 | Knight et al. | 1/1 |
| 6,865,546 B1 | 3/2005 | Song | |
| 6,867,733 B2 | 3/2005 | Sandhu et al. | |
| 6,871,186 B1 | 3/2005 | Tuzhilin et al. | |
| 6,895,406 B2* | 5/2005 | Fables et al. | 707/765 |
| 6,912,505 B2 | 6/2005 | Linden et al. | |
| 7,013,292 B1 | 3/2006 | Hsu et al. | |
| 7,069,308 B2 | 6/2006 | Abrams | |
| 7,072,888 B1* | 7/2006 | Perkins | 707/733 |
| 7,080,117 B2 | 7/2006 | De Pinto et al. | |
| 7,092,821 B2 | 8/2006 | Mizrahi et al. | |
| 7,106,848 B1 | 9/2006 | Barlow et al. | |
| 7,113,917 B2 | 9/2006 | Jacobi et al. | |
| 7,117,254 B2 | 10/2006 | Lunt et al. | |
| 7,139,252 B2 | 11/2006 | Babu et al. | |
| 7,188,153 B2 | 3/2007 | Lunt et al. | |
| 7,234,117 B2 | 6/2007 | Zaner | |
| 7,275,068 B2 | 9/2007 | Huberman et al. | |
| 7,343,335 B1 | 3/2008 | Olliphant | |
| 7,366,990 B2 | 4/2008 | Pitroda | |
| 7,383,258 B2 | 6/2008 | Harik et al. | |
| 7,418,268 B1 | 8/2008 | Cabano et al. | |
| 7,433,876 B2 | 10/2008 | Spivack et al. | |
| 7,454,464 B2 | 11/2008 | Puthenkulam | |
| 7,472,110 B2 | 12/2008 | Achlioptas | |
| 7,478,078 B2 | 1/2009 | Lunt | |
| 7,555,110 B2 | 6/2009 | Dolan et al. | |
| 7,610,287 B1 | 10/2009 | Dean et al. | |
| 7,742,468 B2 | 6/2010 | Vagelos | |
| 2001/0039500 A1 | 11/2001 | Johnson | |
| 2001/0054020 A1 | 12/2001 | Barth et al. | |
| 2002/0023230 A1 | 2/2002 | Bolnick | |
| 2002/0042791 A1 | 4/2002 | Smith et al. | |
| 2002/0059130 A1 | 5/2002 | Cheng et al. | |
| 2002/0059201 A1* | 5/2002 | Work | 707/3 |
| 2002/0103682 A1 | 8/2002 | Stemmer | |
| 2002/0116466 A1 | 8/2002 | Trevithick | |
| 2002/0124053 A1 | 9/2002 | Adams et al. | |
| 2002/0137490 A1 | 9/2002 | Gallant | |
| 2002/0143874 A1 | 10/2002 | Marquette et al. | |
| 2002/0143944 A1 | 10/2002 | Traversat | |
| 2003/0020977 A1 | 1/2003 | Smith et al. | |
| 2003/0083898 A1 | 5/2003 | Wick | |
| 2003/0101227 A1 | 5/2003 | Fink | |
| 2003/0163530 A1 | 8/2003 | Ribak | |
| 2004/0088325 A1 | 5/2004 | Elder | |
| 2004/0093224 A1 | 5/2004 | Vanska | |
| 2004/0122681 A1 | 6/2004 | Ruvolo et al. | |
| 2004/0122803 A1 | 6/2004 | Dom | |
| 2004/0148275 A1 | 7/2004 | Achlioptas | |
| 2004/0162830 A1 | 8/2004 | Shirwadkar et al. | |
| 2004/0172378 A1 | 9/2004 | Shanahan et al. | |
| 2004/0193684 A1 | 9/2004 | Ben-Yoseph | |
| 2004/0215793 A1 | 10/2004 | Ryan et al. | |
| 2004/0220914 A1* | 11/2004 | Cheung et al. | 707/3 |
| 2004/0221309 A1 | 11/2004 | Zaner | |
| 2004/0225681 A1 | 11/2004 | Chaney et al. | |
| 2004/0249811 A1 | 12/2004 | Shostack et al. | |
| 2004/0258220 A1 | 12/2004 | Levine et al. | |
| 2004/0260781 A1 | 12/2004 | Shostack et al. | |
| 2005/0015432 A1 | 1/2005 | Cohen | |
| 2005/0050158 A1 | 3/2005 | Solari | |
| 2005/0071741 A1 | 3/2005 | Acharya et al. | |
| 2005/0120084 A1 | 6/2005 | Hu et al. | |
| 2005/0131894 A1 | 6/2005 | Vuong | |
| 2005/0152521 A1 | 7/2005 | Liljestrand | |
| 2005/0159970 A1* | 7/2005 | Buyukkokten et al. | 705/1 |
| 2005/0159998 A1 | 7/2005 | Buyukkokten et al. | |
| 2005/0165785 A1 | 7/2005 | Malkin et al. | |
| 2005/0171832 A1 | 8/2005 | Hull et al. | |
| 2005/0193054 A1 | 9/2005 | Wilson et al. | |
| 2005/0197846 A1 | 9/2005 | Pezaris et al. | |
| 2005/0198031 A1 | 9/2005 | Pezaris et al. | |
| 2005/0216300 A1 | 9/2005 | Appelman et al. | |
| 2005/0246420 A1 | 11/2005 | Little | |
| 2005/0267766 A1 | 12/2005 | Galbreath et al. | |
| 2005/0283497 A1 | 12/2005 | Nurminen et al. | |
| 2006/0004892 A1* | 1/2006 | Lunt et al. | 707/204 |
| 2006/0026288 A1 | 2/2006 | Acharya et al. | |
| 2006/0077957 A1 | 4/2006 | Reddy et al. | |
| 2006/0085259 A1 | 4/2006 | Nicholas et al. | |
| 2006/0136419 A1 | 6/2006 | Brydon et al. | |
| 2006/0184997 A1 | 8/2006 | La Rotonda et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0004941 A1 | 1/2008 | Calabria | |
| 2008/0056475 A1 | 3/2008 | Brannick et al. | |
| 2008/0133716 A1 | 6/2008 | Rao et al. | |
| 2008/0192656 A1 | 8/2008 | Vagelos | |
| 2009/0013386 A1 | 1/2009 | Puthenkulam | |
| 2011/0098156 A1 | 4/2011 | Ng et al. | |

FOREIGN PATENT DOCUMENTS

| | | |
|---|---|---|
| JP | 2002132604 A | 5/2002 |
| WO | WO 00/68860 | 11/2000 |
| WO | WO 01/24551 | 4/2001 |
| WO | WO0279984 | 10/2002 |
| WO | WO 2005/015470 A1 | 2/2005 |

OTHER PUBLICATIONS

AT&T Personal Reach Service: Benefits and Features, Mar. 29, 2010, 7 pgs.

AT&T Personal Reach Service: Personal Reach Service, Mar. 29, 2010, 2 pgs.

International Search Report, International Application No. PCT/US2008/005118, Sep. 30, 2008, 2 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Google, Inc., "Google Answers," Google, 2004, 1 page, [online] [retrieved on Jul. 29, 2004] retrieved from the internet <URL:http://answers.google.com/answers/>.

Google, Inc., "Google Answers: Frequently Asked Questions," Google, 2003, 9 pages, [online] [retrieved on Jul. 29, 2004] retrieved from the internet <URL:http://answers.google.com/answers/faq.html>.

Yahoo! Inc., "Yahoo! Groups," Yahoo! Inc., 2004, 2 pages, [online] [retrieved on Jul. 29, 2004] retrieved from the internet <URL:http://groups.yahoo.com>.

Yahoo! Inc., "Yahoo! Help—Groups," Yahoo! Inc., 2004, 12 pages, [online] [retrieved on Jul. 29, 2004] retrieved from the internet <URL:http://help.yahoo.com/help/us/groups/groups-01.html>.

Yahoo! Inc., "Yahoo! Help—Groups Database," Yahoo! Inc., 2004, 9 pages, [online] [retrieved on Jul. 29, 2004] retrieved from the internet <URL:http://help.yahoo.com/help/us/groups/database>.

Adamic, L., et al., "A Social Network Caught in the Web," First Monday, Jun. 2003, 29 Pages, vol. 8, No. 6, [online] [Retrieved on Jul. 28, 2004] Retrieved from the internet <URL:http://firstmonday.org/issues/issue8_6/adamic/>.

(56) References Cited

OTHER PUBLICATIONS

Doctorow, C., "Running Notes from Revenge of the User," Revenge of the User: Lessons from Creator/User Battles at the O'Reilly Emerging Technology Conference, Feb. 11, 2004, 5 pages, [online] Retrieved on Jul. 28, 2004] Retrieved from the internet <URL:http://craphound.com/danahetcon04.txt>.
Glance, N., et al., "Knowledge Pump: Community-centered Collaborative Filtering," Xerox Research Centre Europe, Grenoble Laboratory, Oct. 27, 1997, 5 Pages.
Harper, P., "Is Friendster the 'Next Big Thing'? Why millions are jumping on this online bandwagon," Social networking in the digital age, MSN, 2004, 2 pages.
Jensen, C., et al., "Finding Others Online: Reputation Systems for Social Online Spaces," Group Spaces, CHI 2002, Apr. 20-25, 2002, pp. 447-454, vol. 4, Iss. 1.
Sullivan, D., "Is it Really Personalized Search?" Search Engine Watch, Retrieved from the internet on May 13, 2004, 5 pages.
"PlanetAll," From Internet Archive Wayback Machine on Nov. 1997, 19 pages, [online] [Retrieved on Mar. 17, 2004] Retrieved from the internet <URL: Internet Archive Wayback Machine: www.archive.org/www/planetall.com>.
Balabanovic, M., et al., "Content-Based, Collaborative Recommendation," Mar. 1997, pp. 66-72, vol. 40, No. 3.
Kautz, H., et al., "ReferralWeb: Combining Social Networks and Collaborative Filtering," Communications of the ACM, Mar. 1997, 4 Pages, vol. 40, No. 3.
Lueg, C., "Considering Collaborative Filtering as Groupware: Experiences and Lessons Learned," Proceedings of the Second International Conference of Practical Aspects of Knowledge Management, 1998, pp. 16-1-16-6.
Resnick, P., et al., "Recommender Systems," Communications of the ACM, Mar. 1997, pp. 56-58, vol. 40, No. 3.
Rucker, J., et al., "Personalized Navigation for the Web," Communications of the ACM, Mar. 1997, pp. 73-75, vol. 40, No. 3.
Choi, J., "Netflix Prize for the best collaborative filtering algorithm," Data mining and parallelization, CGL Blog, Jul. 16, 2008, [online] [Retrieved on May 13, 2009] Retrieved from the internet <URL: http://jychoireport-cgl.blogspot.com/2008/07/netflix-prize-for-best-collaborative.html>.
"Collaborative filtering," Wikipedia, Last modified Oct. 17, 2007, [online] [Retrieved on May 13, 2009] Retrieved from the internet <URL:http://web.archive.org/web/20071020061658/http:/en.wikipedia.org/wiki/Collaborative_filtering>.
"Mufin.com: content-based recommendations," Net, Blogs and Rock'n'Roll, Oct. 8, 2008, [online] [Retrieved on May 13, 2009] Retrieved from the internet <URL: http://www.netblogsrocknroll.com/2008/10/mufin-music-fin.html>.
"Recommender system," Wikipedia, Last modified Jul. 27, 2009, [online] [Retrieved on Aug. 6, 2009] Retrieved from the internet <URL:http://en.wikipedia.org/wiki/Recommendation_system>.
Rao, R., "The secret of unstructured data" AIIM International, Sep./Oct. 2002, pp. 14-15.
Adamic, L., et al., "A social network caught in the Web", First Monday, 2003, pp. 1-22.
Agarwal, P et al., "Enabling Real-Time User Interests for Next Generation Activity-Oriented Social Networks", A Thesis submitted to the Indian Institute of Technology Delhi in conformity with the requirements for the degree of Bachelor of Technology, 2005, 70 pages.
Anwar, Z., et al., "Leveraging 'Social-Network' Infrastructure to Improve Peer-to-Peer Overlay Performance: Results from Orkut", 2005, 9 pages.
Baird, D., et al., "Neomillennial user experience design strategies: utilizing social networking media to support "Always on" Learning Styles," J. Educational Technology Systems, vol. 34(1) 5-32, 2005-2006.
Boyd, D., et al., "Social Network Sites: Definition, History, and Scholarship", Journal of Computer-Mediated Communication 13 (2008) 210-230.
Churchill, E., et al., "Social Networks and Social Networking", IEEE Internet Computing, Published by the IEEE Computer Society, Sep. Oct. 2005, pp. 14-19.
Cohen, T., et al., "Social Networks for Creative Collaboration", C&C'05, Apr. 12-15, 2005, ACM, pp. 252-255.
Decker, S., et al., "The Social Semantic Desktop", DERI Technical Report May, 2, 2004, May 2004, 7 pages.
Eagle, N., et al., "Social Serendipity: Proximity Sensing and Cueing", MIT Media Laboratory Technical Note 580, May 2004, 18 pages.
Erickson, T., et al., "Social Translucence: Using Minimalist Visualizations of Social Activity to Support Collective Interaction", In Designing Information Spaces: The Social Navigation Approach (eds. K. Höök, D. Benyon, A Munroe), Springer-Verlag: London, 2003, pp. 17-41.
Gross, R., et al., "Information Revelation and Privacy in Online Social Networks", WPES'05, Nov. 7, 2005, ACM, pp. 71-80.
Hammond, T., et al., "Social Bookmarking Tools (I)", D-Lib Magazine, Apr. 2005, 23 pages, vol. 11, No. 4.
Heer, J., et al., "Vizster: Visualizing Online Social Networks", IEEE Symposium on Information Visualization, 2005, 8 pages.
Leonard, A., "You are who you know", published on www.salon.com, Jun. 15, 2004, 15 pages.
Lockheed-Martin Corporation "Battlefield awareness and data dissemination intelligent information dissemination server," AFRL-IF-RS-TR-1999-238, Final Technical Report, Nov. 1999, 31 pages.
Marwick, A.E., "Selling Your Self: Online Identity in the Age of a Commodified Internet", A thesis submitted in partial fulfillment of the requirements for the degree of Master of Arts University of Washington, 2005, 192 pages.
Metcalf, S., et al., "Spatial Dynamics of Social Network Evolution", Presented at the 23rd International Conference of the System Dynamics Society, Jul. 19, 2005, 13 pages.
Mori, J., et al., "Real-world Oriented Information Sharing Using Social Networks", GROUP'05, Nov. 6-9, 2005, ACM, pp. 81-84.
Nardi, B., et al., "Blogging as Social Activity, or, Would You Let 900 Million People Read Your Diary?" CSCW, Nov. 6-10, 2004, ACM, pp. 222-231, vol. 6, Issue 3.
Neumann, M., et al., "Semantic social network portal for collaborative online communities", Journal of European Industrial Training, vol. 29 No. 6, 2005 pp. 472-487.
O'Murchu, I., et al., "Online Social and Business Networking Communities", DERI—Digital Enterprise Research Institute, DERI Technical Report Aug. 11, 2004, Aug. 2004, 22 pages.
Steen, M., et al., "Development of web-centric, context-aware, adaptive mobile services requires empathy and dialogue", Freeband FRUX, 2005, pp. 1-4.
Van Eijk, R., et al., "We-centric, context-aware, adaptive mobile service bundles", Telematica Instituut, Nov. 30, 2004, 48 pages, published on Freeband.
Wenger, E., et al., "Technology for communities", CEFRIO Book Chapter v 5.2, Jan. 18, 2005, pp. 1-15.
Livejournal syndicated accounts (2004), last updated Jan. 6, 2004, can be retrieved at <URL:http://www.livejournal.com/syn/>, 2 pages.
NomadNet, "NomadNet News," web page at <URL:http://www.netnomad.com/> available via the Internet and printed Dec. 1, 2004, 12 pages.
Ofoto, "Ofoto Share Albums," web page at <URL:http://www.ofoto.com/ShareOverview.jsp?UV=363085663086_78428514107> as available via the Internet and printed Dec. 1, 2004, 2 pages.
Online Business Network, "Social Networking Site Guide-Ryze," web page at <URL:http://www.onlinebusinessnetworks.comlonline-social-networks-guide/ryze>, as available via the Internet and printed Dec. 1, 2004, 8 pages.
PC World, "PCWorld—ICQ Builds a Social Network," web page at <URL:http://www.pcworld.com/news/articleIO.aid.115084.OO.asp>, as available via the Internet and printed Dec. 1, 2004, 5 pages.
Petersen's Photographic, "My Photos at Photographic," web page at <URL:http://rnyphotos.photographic.com/>, as available via the Internet and printed Dec. 1, 2004, 19 pages.

(56) References Cited

OTHER PUBLICATIONS

PictureDot, "CactusVision WebCam from PictureDot.com—Broadcast your live webcam now, Free!" web page at <URL:http://www.picturedot.com?CactusVision_WebCam_Info.asp>, as available via the Internetand printed Dec. 1, 2004, 2 pages.

SAE International, "Why should I register to use the SAE website?" web page at <URL:http:my.sae.org/whyregister.htm>, as available via the Internet and printed Dec. 1, 2004, 1 page.

Theme your Desktop, "Free Webcam Thumbnails on your Desktop—ANY webcam.com," web page at <URL:http://themes.anywebcam.comJdesktop/desktop.html> as available via the Internet and printed Dec. 1, 2004, 3 pages.

Westlaw, "WestClip", 2004, web page at <URL:http://west.thomson.com/westlaw/westclip>, as available via the Internet and printed Jul. 28, 2004, 3 pages.

Yahoo!, "Introducing RSS Headlines," web page at <URL:http://e.my.yahoo.com/config/promo content?.module=ycontent>, as available via the Internet and printed Jun. 18, 2004, 1 page.

Yahoo!, "Yahoo! Chat," web page at <URL:http://chat.yahoo.com/>, as available via the Internet and printed Dec. 1, 2004, 1 page.

Yahoo!, "Yahoo! Help-Yahoo! GeoCities Tour," web page at <URLl:http://help.yahoo.com/help/us/geo/tour/tour-01.html>, as available via the Internet and printed Dec. 1, 2004, 20 pages.

Yahoo! Groups, "Customize LostDrive-In," web page at <URL:http://groups.yahoo.com/groups/lostdrive-in/confwiz>, as available via the Internet and printed Jun. 2, 2004, 10 pages.

\* cited by examiner

PERSONALIZING SEARCH QUERIES BASED ON USER MEMBERSHIP IN SOCIAL NETWORK COMMUNITIES

BACKGROUND OF THE INVENTION

1. Field of the Invention

The present invention relates generally to methods and systems for searching. For example, embodiments of the present invention relate generally to methods and systems for using social networks to personalize search queries and results and improve a user's search experience with a search engine.

2. Background

A conventional search engine, such as the Google™ search engine, returns a result set in response to an input query submitted by a user. The search engine performs the search based on a conventional search method. For example, one known method, described in an article entitled "The Anatomy of a Large-Scale Hypertextual Search Engine," by Sergey Brin and Lawrence Page, assigns a degree of importance to a document, such as a web page, based on the link structure of the web page. The search engine ranks or sorts the individual articles or documents in the result set based on a variety of measures. For example, the search engine may rank the results based on a popularity score. The search engine generally places the most popular results near the beginning of the result set.

Unfortunately, because conventional search engines cannot take into account a particular user's personality, preferences, interests, etc., such search engines will often provide irrelevant results. For example, a search for the query term "apple" may provide results pertaining to Apple brand computers, the fruit apple, or a particular musical group called apple, while a particular user may only be interested in one of these topics for the term "apple." Thus, it would be useful to provide methods and systems that take into account information indicative of a particular entity's preferences, interests, etc., when an electronic search is performed for/on behalf of such entity.

SUMMARY OF THE INVENTION

Embodiments of the present invention provide methods and systems for using information provided by social networks to personalize search queries submitted to a search engine or search results provided by the search engine. In one embodiment of the present invention, there is provided a method comprising: receiving a search query from a user; determining personalization information associated with the user from a network of associated users; and providing a search result set relevant to the search query based on at least some of the personalization information. Such personalization information can comprise information gathered from a profile of the user as maintained by the network, information gathered from at least a profile of one of the associated users as maintained by the network (e.g., based on the user's contact information indicating other users that are associated with the user), and/or information about the user as gathered from cookies installed at the user's side (e.g., in the user's computer or machine used for submitting search queries to the search engine). In one embodiment, the cookies are installed at the user's side to record the user's consumer information, including, for example, the user's behavior.

The aforementioned embodiment is mentioned not to limit or define the invention, but to provide an example of embodiments of the invention to aid understanding thereof. Such exemplary embodiment is discussed in the Detailed Description, and further description of the invention is provided there. Advantages offered by the various embodiments of the present invention may be further understood by examining this specification.

BRIEF DESCRIPTION OF THE DRAWINGS

The embodiments of the present invention are illustrated by way of example in, and not limited to, the following figures.

DETAILED DESCRIPTION

Overview

As referred herein, a search result set comprises one or more identifiers of articles that are relevant to a search query. Articles include, for example: word processor, spreadsheet, presentation, e-mail, instant messenger, database, and other client application program content files or groups of files; web pages of various formats (e.g., HTML, XML, XHTML); portable document format (PDF) files; audio files; video files; or any other documents or groups of documents or information of any type whatsoever. An article identifier may be, for example, a uniform resource locator (URL), a uniform resource identifier (URI), a file name, a link, an icon, a path for a local file, or anything else that identifies an article.

Embodiments of the present invention provide methods and systems for members of a social network to personalize search queries and/or search results based on members' information gathered from the social network. In one embodiment, the method begins with a user joining a social network and creating a member profile in the social network. Once the user becomes a member, the user can access the social network and initiate a search from within the network to a search engine. When the search engine receives a search query from the user, the search engine can access the social network to gather personalization information associated with the user, including information contained in the user's member profile. Based on the gathered information, the search engine can personalize the search and tailor the search results for the user. Alternatively, in another embodiment, the user can initiate a search from within the search engine; however, the search engine is linked with the social network, and the user is given an option to personalize the search. If the user exercises such option, the search engine can again access the social network to gather personalization information associated with the user for a personalized search.

System Architecture

Figure 1:
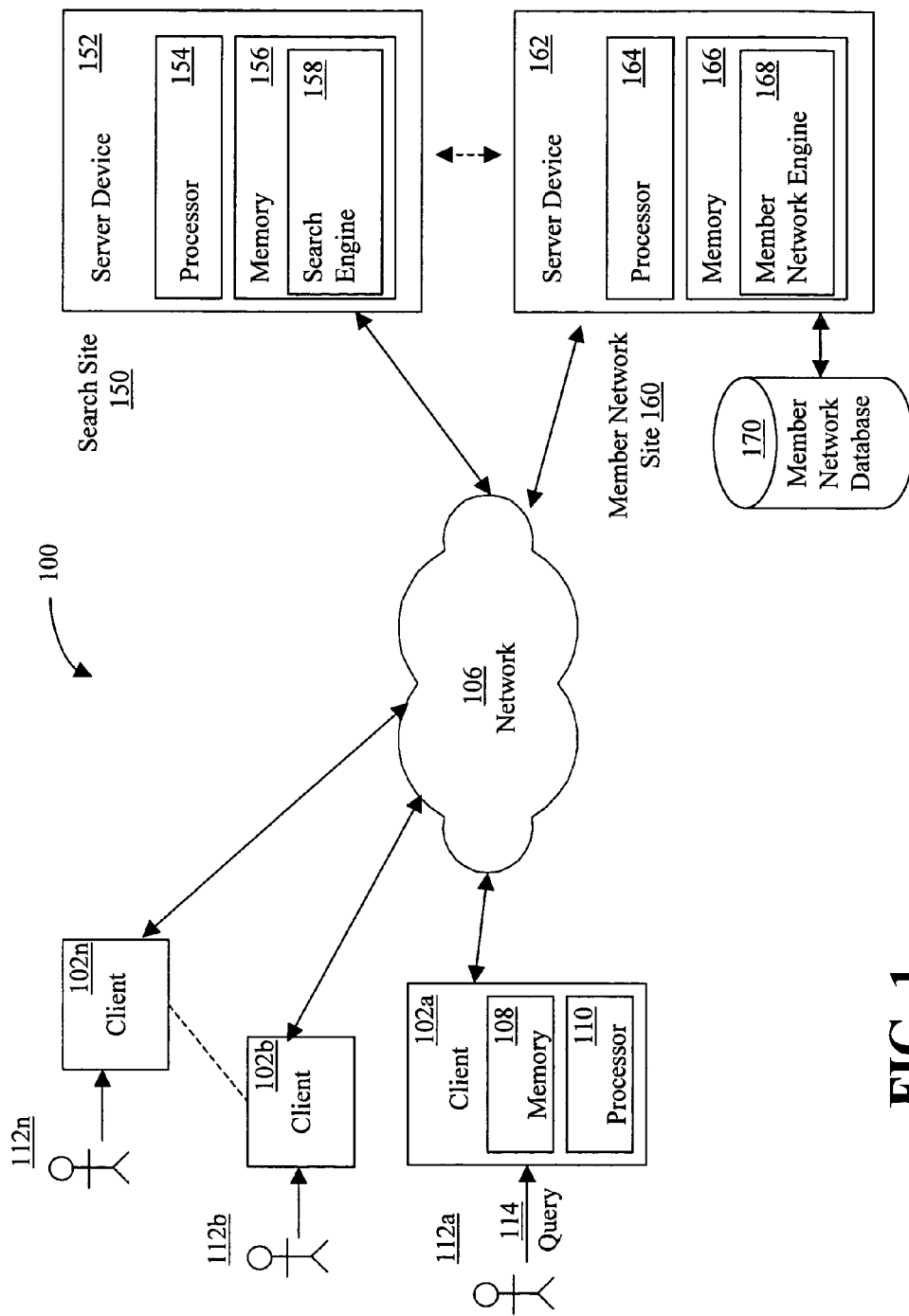
FIG. 1 is a block diagram illustrating an exemplary environment in which embodiments of the present invention may operate.

Various systems in accordance with the present invention may be constructed. FIG. 1 is a block diagram illustrating an exemplary system in which embodiments of the present invention can operate. The present invention may operate, and be embodied, in other systems as well.

Referring now to the drawings in which like numerals indicate like elements throughout the several figures, FIG. 1 is a block diagram illustrating an exemplary system in accordance with an exemplary embodiment of the present invention. The system 100 shown in FIG. 1 includes multiple client devices 102*a-n* with users 112*a*-112*n* in communication with a search site 150 and a social network site 160 over a network 106. The search site 150 and the social network site 160 are also in communication with each other directly (as shown by the dashed line) or through the network 106. The network 106 can be a wired or wireless network. Further, it can be a public network, e.g., the Internet, or a private data network, e.g., a local area network (LAN) or a wide area network (WAN). Moreover, methods according to the present invention may operate within a single computer.

Each of the client devices 102*a-n* includes a memory 108, which can be a computer-readable medium (CRM), such as a random access memory (RAM), coupled to a processor 110. The processor 110 executes computer-executable program instructions stored in the client device, such as memory 108, as program code. Such processor may include a microprocessor, an ASIC, and state machines. Such processors include, or may be in communication with, media, for example computer-readable media, which stores instructions that, when executed by the processor, cause the processor to perform the methods described herein. Moreover, the processor 110 can be any of a number of computer processors, such as processors from Intel Corporation of Santa Clara, Calif. and Motorola Corporation of Schaumburg, Ill. Embodiments of computer-readable media include, but are not limited to, an electronic, optical, magnetic, or other storage or transmission device capable of providing a processor, such as the processor 110 of client 102*a*, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, switch, private or public network, or other transmission device or channel, both wired and wireless. The instructions may include code from any suitable computer-programming language, including, for example, C, C++, C#, Visual Basic, Java, Python, Perl, and JavaScript.

Client devices 102*a-n* can also include a number of external or internal devices such as a mouse, a CD-ROM drive, a DVD drive, a keyboard, a display, or other input or output devices. Examples of client devices 102*a-n* are personal computers, digital assistants, personal digital assistants (PDAs), cellular phones, mobile phones, smart phones, pagers, digital tablets, laptop computers, Internet appliances, and other processor-based devices. In general, the client devices 102*a-n* can be any type of processor-based platform that operates on any operating system capable of supporting one or more client application programs. Client devices 102*a-n* may operate on any operating system capable of supporting a browser or browser-enabled application, such as Microsoft® Windows® or Linux. The client devices 102*a-n* shown include, for example, personal computers executing a browser application program such as Microsoft Corporation's Internet Explorer™, Netscape Communication Corporation's Netscape Navigator™, and Apple Computer, Inc.'s Safari™.

Through the client devices 102*a-n*, users 112*a-n* can communicate over the network 106 with each other and with other sites, systems and devices coupled to the network 106. As shown in FIG. 1, a search site 150 and a social network site 160 are also coupled to the network 106.

The search site 150 shown includes a server device 152 executing a search application program. Similar to the client devices 102*a-n*, the server device 152 shown includes a processor 154 coupled to a CRM 156. Server device 152, depicted as a single computer system, may be implemented as a network of computer processors. Examples of the server device 162 are servers, mainframe computers, networked computers, a processor-based device, and similar types of systems and devices. The server processor 154 can be any of a number of computer processors, such as processors from Intel Corporation of Santa Clara, Calif. and Motorola Corporation of Schaumburg, Ill.

Memory 156 contains a search application program, also known as a search engine 158. The search engine 158 locates relevant information in response to a search query from one of the client devices 102*a-n*, e.g., the client device 102*a*. In the embodiment shown, the server device 152, or related devices, has previously performed a crawl of the network 106 to locate articles, such as web pages, stored at other devices or systems coupled to the network 106, and indexed the articles in an article index for storage in memory 156 or another data storage device. Thus, the search engine 158 can locate relevant information by accessing the article index in response to a search query. The search engine 158 then provides a search result set to the client device 102*a* via the network 106. The search result set comprises one or more identifiers of articles that are relevant to the search query. Articles include, for example: word processor, spreadsheet, presentation, e-mail, instant messenger, database, and other client application program content files or groups of files; web pages of various formats (e.g., HTML, XML, XHTML); portable document format (PDF) files; audio files; video files; or any other documents or groups of documents or information of any type whatsoever. An article identifier may be, for example, a uniform resource locator (URL), a uniform resource identifier (URI), a file name, a link, an icon, a path for a local file, or anything else that identifies an article.

The social network site 160 shown includes a social network database 170 and a server device 162 executing a social network engine application program. Similar to the client devices 102*a-n*, the server device 162 shown includes a processor 164 coupled to a CRM 166. The server device 162 is in communication with a social network database 170. Server device 162, depicted as a single computer system, may be implemented as a network of computer processors. Examples of the server device 162 are servers, mainframe computers, networked computers, a processor-based device, and similar types of systems and devices. The server processor 164 can be any of a number of suitable computer processors, such as processors from Intel Corporation of Santa Clara, Calif. and Motorola Corporation of Schaumburg, Ill.

Memory 166 in the server device 162 contains a social network engine application program, also known as a social network engine 168. The social network engine 168 allows users, such as user 112*a*, to interact with and participate in a social network. A social network can refer to a network connecting people or organization by a set of relationships, such as social relationships like friendship, co-working, or information exchange. A social network can include profiles that can be associated with other profiles. Each profile may represent a member and a member can be, for example, a person, an organization, a business, a corporation, a community, a fictitious person, or other entity. Each profile can contain entries, and each entry can include information associated with a profile. Examples of entries for a person profile can include information regarding relationship status, birth date, age, children, ethnicity, religion, political view, sense of humor, sexual orientation, fashion preferences, smoking habits, drinking habits, pets, hometown location, passions, sports, activities, favorite books, music, television, or movie preferences, favorite cuisines, email addresses, location information, IM name, phone number, address, skills, career, or any other information describing, identifying, or otherwise associated with a profile. Entries for a business profile can include market sector, customer base, location, supplier information, net profits, net worth, number of employees, stock performance, or other types of information associated with the business profile.

Additionally, entries within a profile can include associations with other profiles. Associations between profiles within a social network can include, for example, friendships, business relationships, acquaintances, community or group associations, activity partner associations, common interest associations, common characteristic associations, or any other suitable type of relationship connection (e.g., social relationship connection). Members can set up new associations or join existing associations in the social network as desired. For example, a member can set up a "Computer Science community" for those members who are interested or work in the computer science field. Likewise, a member can join an existing "Baseball community" if the member is interested in baseball and/or sport in general. Associations between profiles can also have various levels. For example, friendship levels can include, for example, a "haven't met" level, an "acquaintance" level, a "friend" level, a "good friend" level, a "best friend" level, and other suitable levels.

Moreover, entries within a profile can include member classifications or labels based on their profile associations within the social network. For example, a member that belongs to the Computer Science community in the social network can be classified or labeled a "techie", whereas a member that belongs to the Baseball community in the social network can be labeled a "sports fan". A single member can have multiple labels. For example, a member that belongs to both the Computer Science and Baseball communities in the social network can be labeled a "techie" and a "sports fan".

A degree of separation based on associations between profiles can also be determined. For example, a degree of separation can be determined based on the fewest number of associations between two profiles. Thus, if profile A is a friend of profile B, and profile B is a friend of profile C, there can be a degree of separation of two between profiles A and C. A degree of separation can be type specific or type neutral. Type specific degrees of separation only count relationships of a certain type. Thus, for example, in the case above where A is a friend of B, and B is a friend of C, there is a friendship degree separation of two, even if A is directly associated with C by a business association, which would otherwise produce a degree of separation of 1.

The social network engine 168 can be linked to the search engine 158, whereby a member within the social network engine 168 can access the search engine 158 via a search tool to conduct a search. The search tool can be accessible from within each member's profile or within a created association in the social network, such as a community like the Computer Science community.

Server device 162 of the social network site 160 also provides access to storage elements, such as a social network storage element, in the example shown in FIG. 1, a social network database 170. The social network database 170 can be used to store profiles of members in a social network and to store communities within the social network as created by the member-network engine 168. Data storage elements may include any one or combination of methods for storing data, including without limitation, arrays, hash tables, lists, and pairs. Other similar types of data storage devices can be accessed by the server device 162. The social network engine 168 can receive data comprising the profiles and created associations from the member-network database 170 and can also send data comprising created associations and profiles to the social network database 170 for storage. The member-network database 170 may be physically attached or otherwise in communication with the member-network engine 168 by way of a network or other connection.

Figure 3:
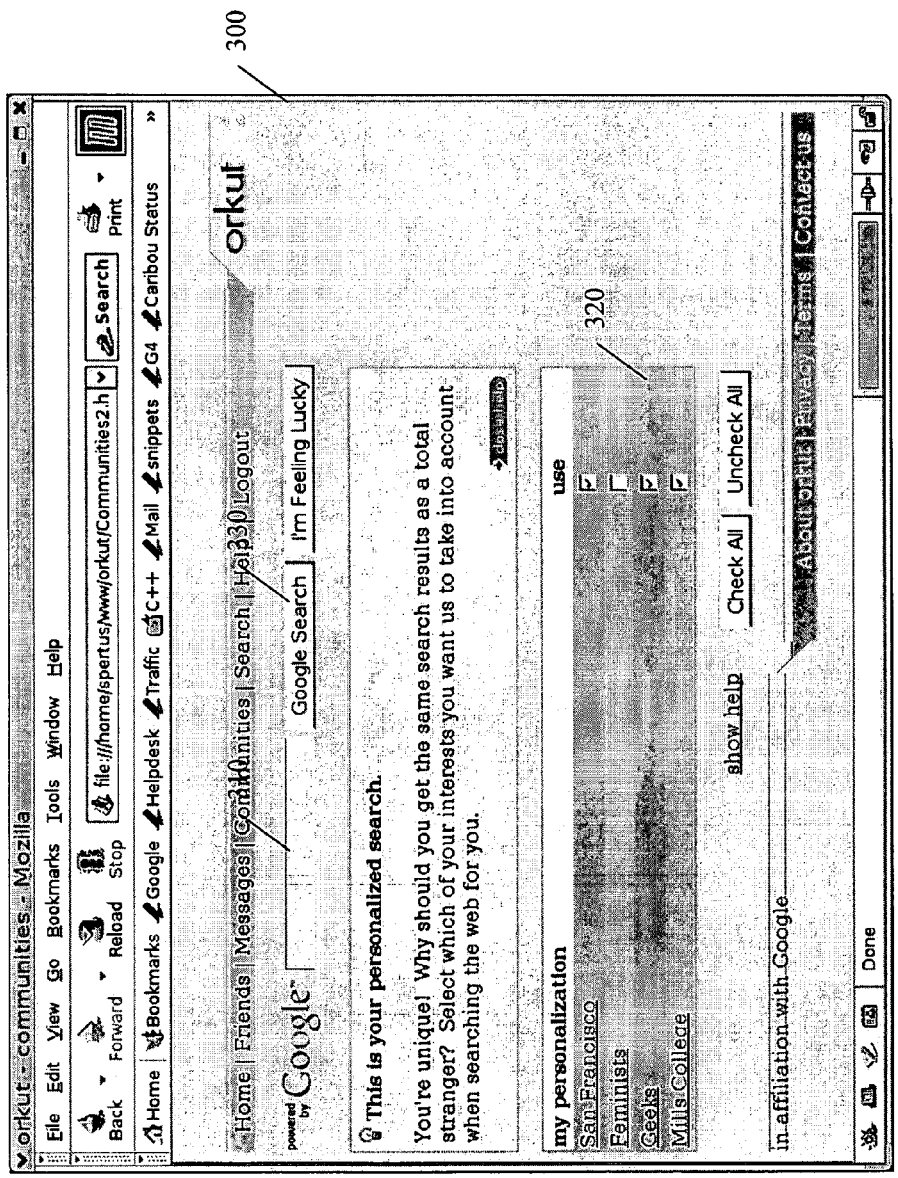
FIG. 3 depicts a sample screenshot of a search tool in a member profile in accordance with an embodiment of the present invention.
Figure 4:
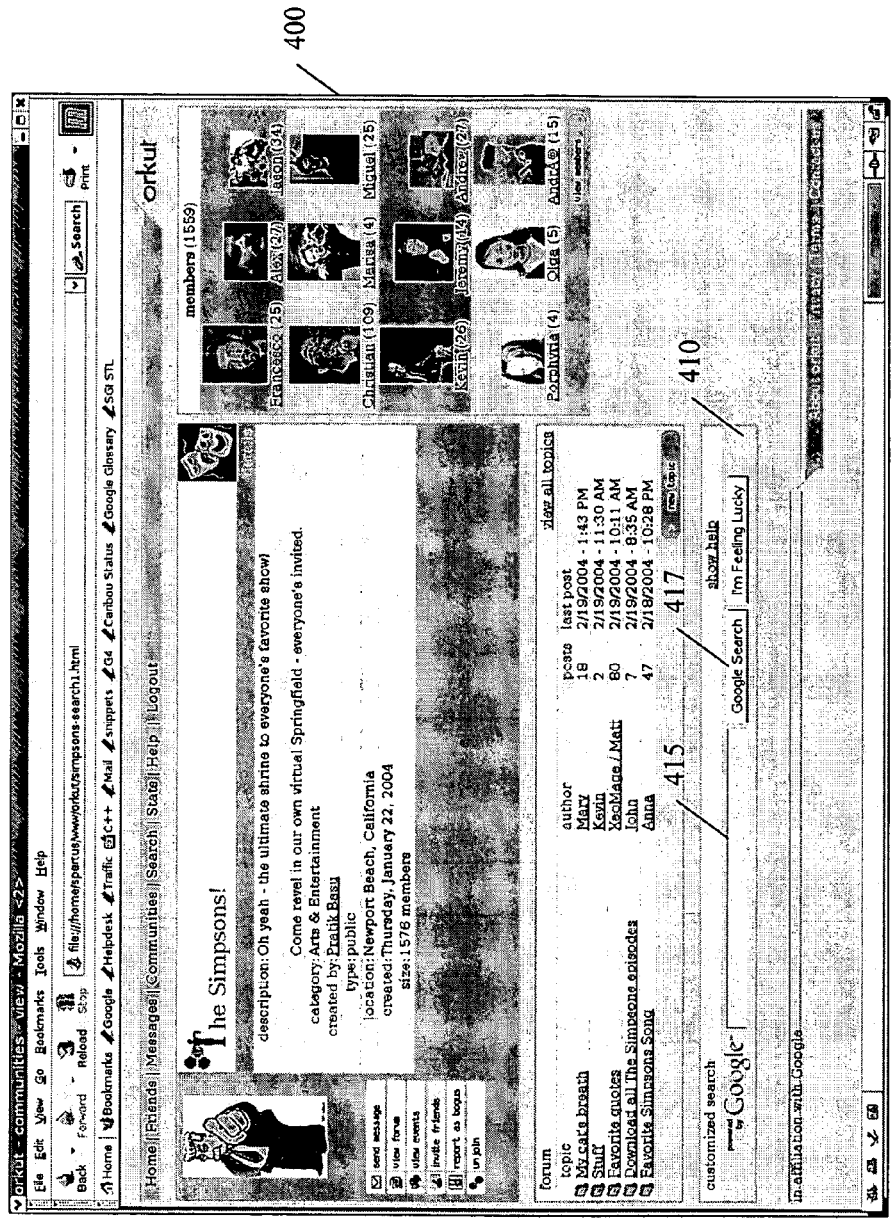
FIG. 4 depicts a sample screenshot of a community in a social network having a built-in search tool in accordance with an embodiment of the present invention.

In operation, a member of a social network can submit an input query to a search engine, such as the search engine 158, through a search tool in the member profile or an association created within the social network, as described earlier. FIG. 3 shows a sample screenshot of a search tool 300 in a member profile in accordance with an embodiment of the present invention. FIG. 4 shows a sample screenshot of a created association, e.g., The Simpsons community (i.e., a community with members that are interested in the television show "The Simpsons"), in accordance with an embodiment of the present invention. Because the search engine 158 is linked to the social network engine 168, it can access the social network database 170 through the social network engine 168 and look up the member's profile to personalize the search query and search results. Such search personalization can affect the searching methodology and/or ranking of search results that are returned to the member. The methods for accomplishing these tasks are described below in the process section.

It should be noted that the present invention may include systems having different architecture than that which is shown in FIG. 1. For example, in some systems according to the present invention, server device 162 may include a single physical or logical server. The system 100 shown in FIG. 1 is merely exemplary, and is used to help explain the social networks and methods illustrated in subsequent figures.

Exemplary Social Network

Figure 2:
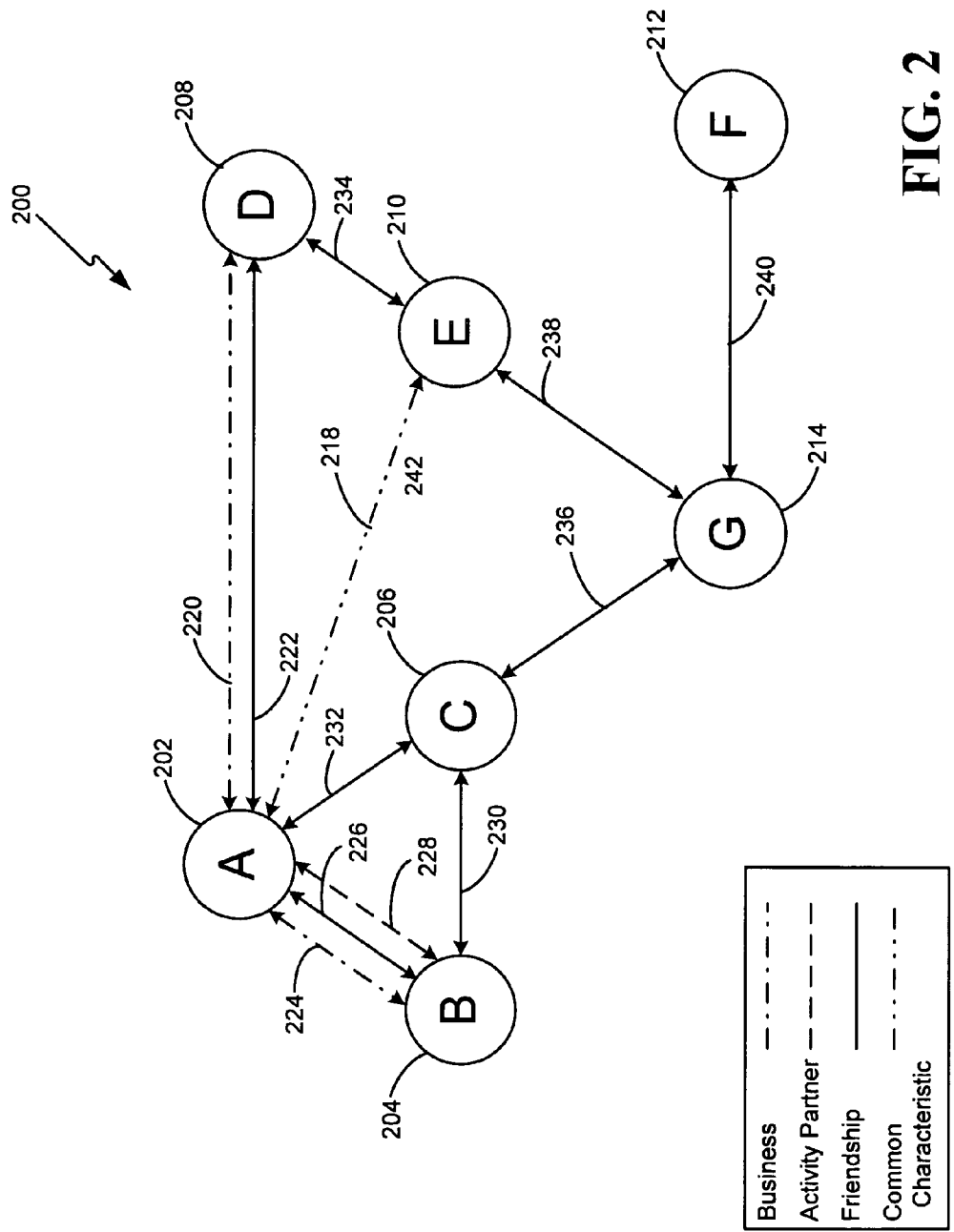
FIG. 2 depicts a diagram of a social network in accordance with an embodiment of the present invention.

FIG. 2 shows a diagram of a social network 200 according to one embodiment of the present invention. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, and 234. The vertices 202, 204, 206, 208, 210, 212, and 214 comprise profiles A, B, C, D, E, F, and G, respectively. Each profile can represent a member profile of a member of the social network 200. The exemplary network 200 shown in FIG. 2 has seven members. Considerably more members can be part of the social network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, television, or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the social network 200 in specific categories, such as humor, intelligence, fashion, trustworthiness, sexiness, and coolness. A member's category ratings can be contained in the member's profile. In one embodiment of the social network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the social network, such as the frequency that the member logs in to the social network and the member's most recent login to the social network. Membership information can also include information about the rate and frequency that a member profile gains associations to other member profiles. In a social network that comprises advertising or sponsorship, a member profile may contain consumer information. Consumer information may include: the frequency, patterns, types, or number of purchases the member makes; information about which advertisers or sponsors the member has accessed, patronized, or used; and/or information about a member's behavior, e.g., areas of the social network and/or other articles that the member previously accessed and viewed.

A member profile may comprise data stored in memory. The profile, in addition to comprising data about the member, can also comprise data relating to others. For example, a member profile can contain an identification of associations or virtual links with other member profiles. In one embodiment, a member profile includes an identification of association(s) to which the member belongs. For example, a member profile can indicate that the member belongs to the Computer Science community. Moreover, membership information can include a classification of the member based on the member's various associations. For example, the member can be classified as a "sports fan" because the member belongs to the Baseball community. In another embodiment, a member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other members' profiles with which the member wishes to be associated.

An association may be designated manually or automatically. For example, a member may designate associated members manually by selecting other profiles and indicating an association that can be recorded in the member's profile. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits.

Associations between profiles within a social network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, and 234 shown comprise associations between profiles. According to the embodiment shown in FIG. 2, the social network 200 comprises a plurality of differing types of associations represented by edges 218, 220, 222, 224, 226, 228, 230, 232, and 234. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A, B, C, D, E, F, and G comprising the vertices 202, 204, 206, 208, 210, 212, and 214, respectively, for purposes of illustration, comprises a person. Other types of members can be in social network 200. For example, communities, special interest groups, organizations, political parties, universities, and legal persons, such as corporations and business partnerships may be members of the social network 200. The associations 218, 220, 222, 224, 226, 228, 230, 232, and 234 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends would include profile B, but a display of profile B's friends would not include profile A.

Within a social network, a degree of separation can be determined for associated profiles. In one embodiment, a degree of separation between two profiles can be determined by the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example, can be that profile A attended the same high school as profile E. A common characteristic association may be selected by profiles A and E to represent that they are associated in some fashion, but to not create a close association such as with a friendship association.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each associations and a corresponding weighting factor prior to summing the associations. Thus, highly weighted associations would contribute less to the resulting sum than lower weighted associations.

Process

Various methods or processes in accordance with the present invention may be constructed. For example, in one embodiment, the method begins with receiving a search query from a user. Next personalization information associated with the user is determined from a network of associated users. At least some of the personalization information is then used to provide a search result set relevant to the search query. The personalization information can comprise information gathered from the user's member profile in the network, one or more profiles of other associated users in the network (e.g., based on the user's contact information indicating other users that are associated with the user), and/or information about the user as gathered from cookies installed at the user's side (e.g., in the user's computer or machine used for submitting search queries to the search engine). In one embodiment, the cookies are installed at the user's side to record the user's consumer information, including, for example, the user's behavior as described earlier. Such personalization information can further include information about an association in the network to which the user belongs. The personalization information can be provided by the user explicitly or implicitly for use in providing the search result set, and such personalization information can be provided by the user from within the user's member profile in the social network or from within an association in the social network to which the user may or may not belong. Further, the amount of personalization information on which the search result set is based can be determined from the level of search personalization as input by the user via a scale or selection of one or more associations in the network. The personalization information can be added to the search query in order to provide the search result set or it can be used to rank articles identified in the search result set.

Figure 6:
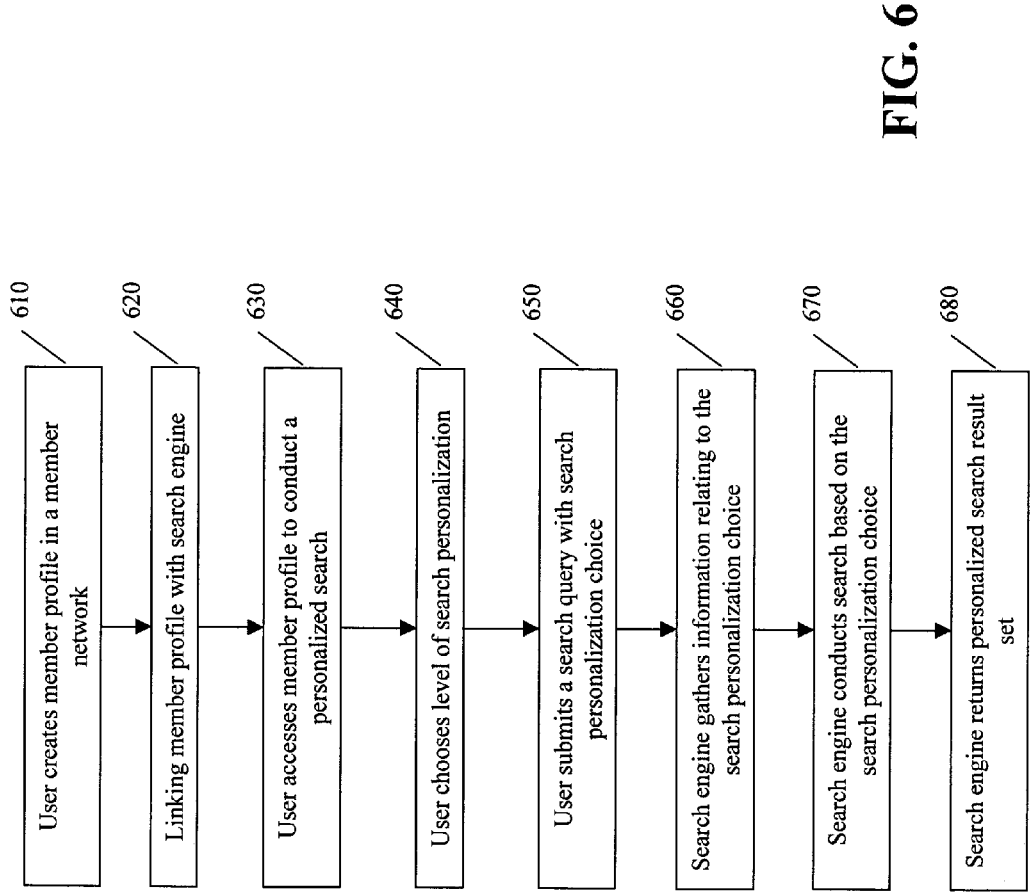
FIG. 6 depicts a process flow for search personalization in accordance with an embodiment of the present invention.
Figure 7:
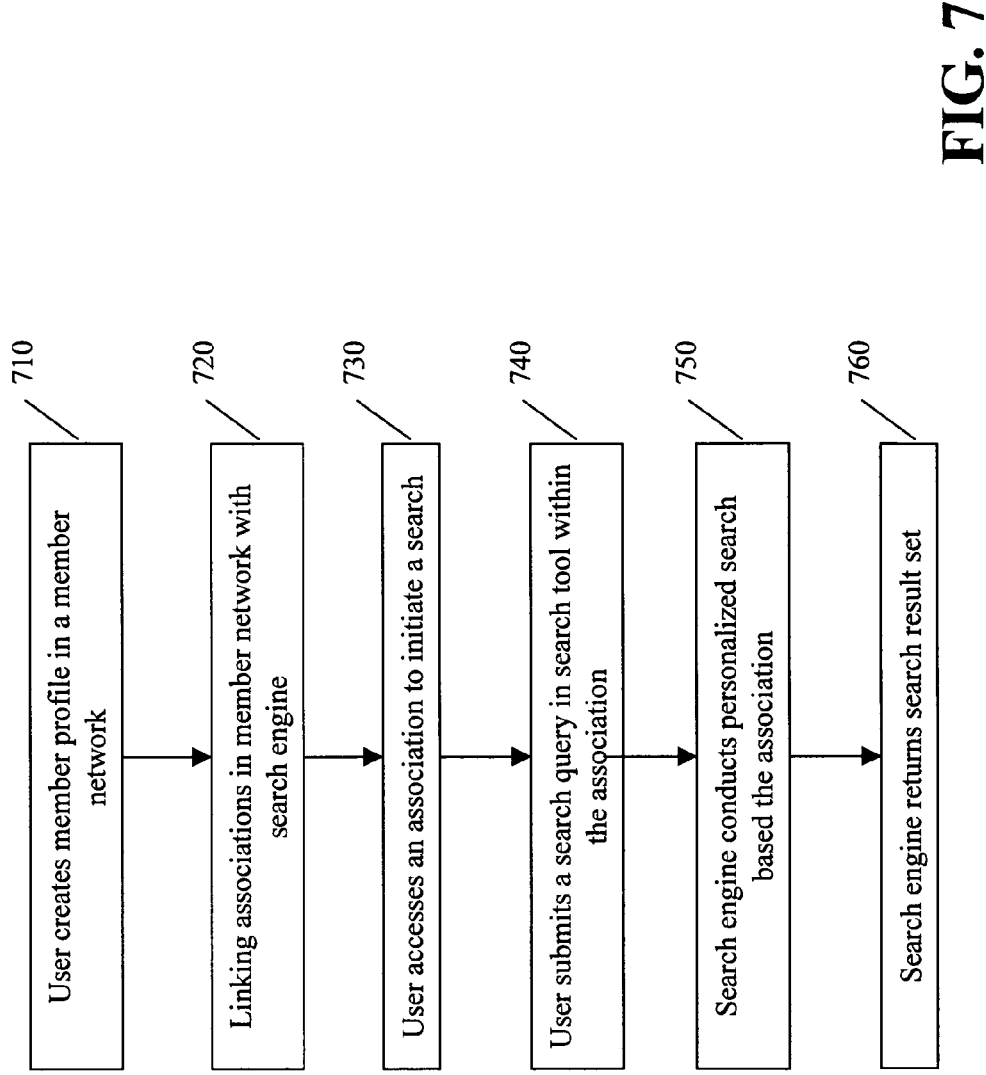
FIG. 7 depicts a process flow for search personalization in accordance with another embodiment of the present invention.
Figure 8:
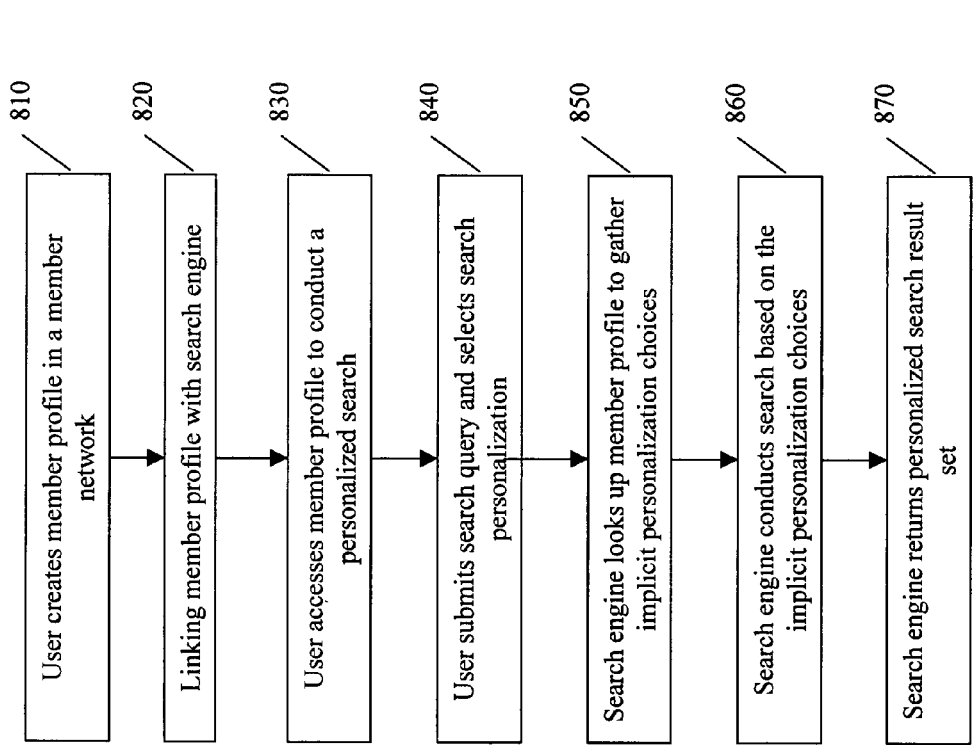
FIG. 8 depicts a process flow for search personalization in accordance with still another embodiment of the present invention.

FIGS. 6-8 illustrate exemplary methods that provide search personalization at a search engine whereby search queries and search results can be personalized based on a member's personalization information as gathered from a social network. As referred herein, a member's personalization information includes any information that is associated with the member, including any information contained in the member profile or maintained by the social network and is in any way associated with the member. The exemplary methods are provided by way of example, as there are a variety of ways to carry out methods according to the present invention. The method shown in FIGS. 6-8 can be executed or otherwise performed by one or a combination of various systems. The methods in FIGS. 6-8 are described below as carried out by the system 100 shown in FIG. 1 by way of example, and various elements of the system 100 are referenced in explaining the example methods of FIGS. 6-8.

Referring to the method depicted in FIG. 6, with further reference to the sample screenshot shown in FIG. 3, wherein a search can be personalized based on a desired personalization level. The method begins at 610 with a user, such as user 112*a*, joining a social network, such as the social network 200 (e.g., Orkut™), by creating a user or member profile, as described earlier.

At 620, the created member profile is linked to a search engine, such as the search engine 158 at the search site 152. In one embodiment, the social network engine 168 provides the created member profile with a search tool 300, as shown in FIG. 3, for linkage to the search engine 158.

At 630, as a member of the social network, the user 112*a* can access his or her member profile and the search tool 300 therein to gain access to the search engine 158 for a personalized search.

At 640, the user 112a can choose the desired level of personalization for a search. For example, the user 112a belongs to multiple communities, e.g., a San Francisco community, a Feminists community, a Geeks community, and a Mills College community, whereby the user 112a wishes to personalize a search based on his or her association with one or more of such communities. In the embodiment shown in FIG. 3, the search tool 300 provides the user 112a with a list of personalization information, such as a list of communities 320 to which the user 112a belongs and an option to use one or more of such communities on which to base a search of a query at 310. As shown, the San Francisco, Geeks, and Mills College communities are selected to personalize the search. In another embodiment, the community listings 320 can include associations other than those communities to which the user 112a belongs. In still another embodiment, instead of the community listings 320, a list of the user's 112a classifications based on those communities or associations to which the user 112a belongs or with which the user 112a is affiliated can be provided. For example, the San Francisco community can be classified as "Bay Area", the Feminists community can be classified as "Women Empowerment", the Geeks community can be classified also as "techie", and "Mills College" can be classified as "local colleges". Thus, a personalization search can be based on such classifications.

In still another embodiment, a scale slider can be provided in lieu of the classification or community listings 320 to provide the user 112a with the option to personalize a search. For example, the scale slider can be from levels 1 to 5, with level 1 being the most generic search and level 5 being the most personalized search. If the user 112a moves the slider to level 1, the search engine 158 will conduct a normal search of the input query entered at 310 without basing the search on any other criteria. In other words, the search engine 158 locates articles from websites, systems, and/or devices that are accessible by the network 106 and returns article identifiers associated with articles relevant to the input query at 310 in a search result set. However, if the user 112a moves the slider to any other level, the search engine 158 will conduct a personalized search of the input query entered at 310 based on the level chosen. As an example, level 2 can indicate a search based on one of the four communities (or classifications) listed at 320; level 3, search based on two of the four communities (or classifications); level 4, a search based on three of the four communities (or classifications); and level 4, a search based on all four communities (or classifications). The community, communities, classification, or classifications to be selected for each level merely depend on the programming of the search engine 158 and/or social network engine 168. The degree of use of the community, communities, classification, or classifications may vary; for example, the degree of use of communities for personalized search may vary depending on how often or how much the user participates or has participated in each community.

At 650, the user 112a submits an input query to the field 310, along with a corresponding personalization choice entered at 320, to the search engine 158 (e.g., by clicking on button 330).

Figure 5:
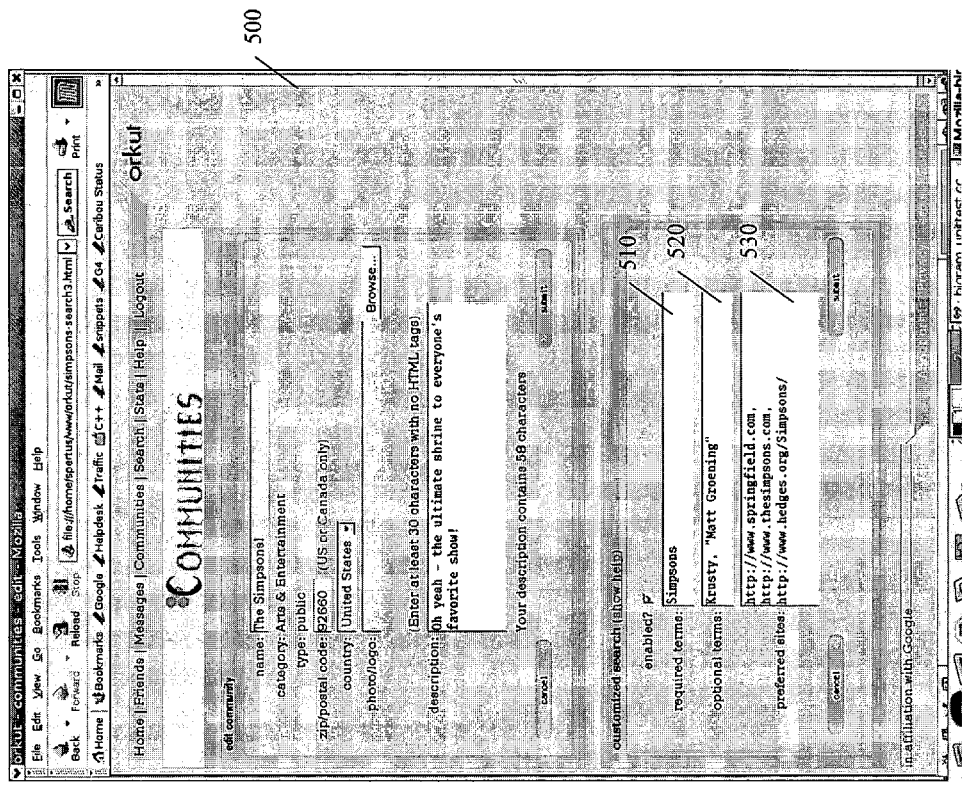
FIG. 5 depicts a sample screenshot of an association editing tool in accordance with an embodiment of the present invention.

At 660, in response to receiving the input query and the corresponding personalization choice, the search engine 158 searches the social network database 170 by communicating with the server device 162 and its social network engine 168 to identify and obtain additional information relating to the personalization choice. Each community in the social network can be edited by the social network administrator, a member that created the community, or any other entity with association editing capability, to include added query phrase(s) and/or term(s) to be used in a personalized search based on such community. FIG. 5 shows a sample screenshot of an association editing tool 500 for, e.g., The Simpsons community, wherein added query phrase(s) and/or term(s) can be entered in the fields 510 and 520. The editing tool 500 also includes a field 530 for the user's entries of specially-chosen or preferred sites on which a personalized search additionally can be focused if the personalization is based on such community. In the aforementioned example, similar association editing tools are also available for the San Francisco, Feminists, Geeks, and Mills College communities.

In one embodiment, the owner or creator of each community or group can specify the entries in fields 510, 520, and 530 to provide added query phrase(s), terms, and/or preferred sites for search customization. Each community/group may also allow members belonging to the community/group to suggest query phrase(s), terms, and/or preferred sites in lieu of or in addition to those specified by the owner/creator. The members can also suggest phrase, term, or site restriction (not shown). Moreover, such members can vote for or against others' suggestions directly or by rating search results that are based on the search customization of the community/group, wherein the rating is applied back to the suggested phrases, terms, and/or preferred sites to increase or decrease their weights accordingly (e.g., moving a phrase or term from the required term field 510 to the optional term field 520). Members belong to a community/group can be motivated to provide such feedback because they can see improvement in the search results and help other community/group members. Alternative to rating the search results, click-through rates (CTRs) of search results that are based on the search customization of the community/group can be obtained, wherein the CTRs are applied back to the suggested phrases, terms, and/or preferred sites to adjust their weights accordingly (e.g., higher CTRs indicate higher weight for including a suggested element in the search query and lower CTRs indicate lower weight assignment).

In another embodiment, terms, phrases, and preferred sites may be automatically extracted from communities. For example, analysis of the text in messages posted to a community can identify common terms or phrases. Analysis of how often participants or community members mention web sites in the community can be used to identify preferred sites. In still another embodiment, analysis of the web sites visited by members of a community can be used to identify preferred sites, for example sites that are often visited by at least a certain percentage of community members.

At 670, the search engine 158 conducts a search of the input query entered at 310 based on the personalization choice, i.e., in view of the obtained additional information relating to such personalization choice. In one embodiment, the search engine 158 first conducts a normal search of the input query entered at 310, using the article index stored in memory 156 or another data storage device as mentioned earlier, and returns a first search result set of article identifiers. Next, the added query phrase(s), term(s), and/or preferred site(s) can be used to re-search the underlying articles represented by the article identifiers to determine the relevancy of each article to the community included in the personalization choice. Based on the relevancy of the articles after the re-search, the article identifiers in the first search result set are ranked, ordered, and/or filtered and returned to the user 112a. For example, the user 112a submits an input query "animation" at 310 chosen to be personalized based on The Simpsons community. First, the search engine 158 conducts a normal search and returns a first search result set that includes article identifiers representing articles about various different animation series, e.g., Japanese animation series, Saturday morning cartoon series, afternoon cartoon series, including The Simpsons television series. Next, the added phrase(s) and/or term(s) obtained from The Simpsons community in the social network is used, namely, the required and optional entries from fields 510, 520, and 530 are used to re-search the articles identified in the first search result set. Based on the re-search, the article identifiers in the first search result set are ranked or ordered wherein those article identifiers for articles about the Simpsons television series may be placed at the beginning of the first search result set, which is now personalized. Alternatively, the re-search provides a filter whereby only those article identifiers for articles about the Simpsons television series are returned in a personalized search result set.

In another embodiment, the search engine 158 can use the added query phrase(s) and/or term(s) to affect the searching methodology by expanding the input query at 310 and narrow the search to only articles that include the added query phrase(s) and/or term(s) in accordance with any query expansion technique known in the field of information retrieval. For example, the user 112*a* again submits an input query "animation" at 310 chosen to be personalized based on The Simpsons community. The search engine 158 then uses the added phrase(s) and/or term(s) obtained from The Simpsons community to expand the input query "animation" to include "Simpsons" and either "Krusty" or "Matt Groening". The search engine 158 then locates articles from network 106, by searching the article index stored in memory 156 or another data storage device as mentioned earlier, that are relevant to the expanded input query, e.g., those articles that are relevant to the Simpsons television series and not to other animation series, to be included in the search result set.

At 680, the search engine 158 returns the search result set to the user 112*a*, wherein the search result set can be provided in the search tool 300 within the member profile or a display provided by the search engine 158.

Referring now to a method depicted in FIG. 7 with further reference to the sample screenshot shown in FIG. 4, wherein a search can be personalized based on the association within which the search is conducted. This method begins at 710 with a user, such as user 112*a*, joining a social network, such as the social network 200 (e.g., Orkut™), by creating a user or member profile, as described earlier. As a member of the social network, the user 112*a* can access existing associations or create new associations in the social network.

At 720, the social network engine 168 link the associations in the social network with the search engine 158 as they are created. In one embodiment, the social network engine 168 provides a search tool within each association created in the social network. For example, as shown in FIG. 4, The Simpsons community 400 includes a search tool 410 for linkage to the search engine 158.

At 730, the user 112*a* can login to the social network and access, e.g., The Simpsons community 400, to initiate a personalized search via the search tool 410. Unlike the method shown in FIG. 6, the user 112*a* does not choose the level of personalization for a search because the search is automatically personalized based on the association from which the user 112*a* initiates the search. In this case, the personalized search is based on the Simpsons community 400.

At 740, the user 112*a* submits an input query entered at 415 in the search tool 410 to the search engine 158 (e.g., by clicking on button 417). As described earlier with regard to the method depicted in FIG. 6, each community in the social network can be edited by the social network administrator, a member that created the community, or any other entity with association editing capability, to include added query phrase(s) and/or term(s) to be used in a personalized search based on such community. FIG. 5 shows a sample screenshot of a association editing tool 500 for, e.g., The Simpsons community, wherein added query phrase(s) and/or term(s) can be entered in fields 510 and 520. The editing tool 500 also includes a field 530 for the user's entries of specially-chosen or preferred sites on which a personalized search additionally can be focused if the personalization is based on this particular community. Similar association editing tools are available for other associates.

At 750, the search engine 158 conducts a personalized search of the input query entered at 415, using the article index stored in memory 156 or another data storage device as mentioned earlier, based on The Simpsons community 400 from which the user 112*a* initiates the search, in this case, the association is The Simpsons community 400. In one embodiment, the search engine 158 first conducts a normal search of the input query entered at 415 and returns a first search result set of article identifiers. Next, the added query phrase(s), term(s), and/or preferred site(s) can be used to re-search the underlying articles represented by the article identifiers to determine the relevancy of each article to the community included in the personalization choice. Based on the relevancy of the articles after the re-search, the article identifiers in the first search result set are ranked, ordered, or filtered and returned to the user 112*a*. For example, the user 112*a* submits an input query "animation" at 415 chosen to be personalized based on The Simpsons community 400. First, the search engine 158 conducts a normal search and returns a first search result set that includes article identifiers representing articles about various different animation series, e.g., Japanese animation series, Saturday morning cartoon series, afternoon cartoon series, including The Simpsons television series. Next, the added phrase(s), term(s), and/or preferred site(s) obtained from The Simpsons community is used, namely, the required and optional entries from fields 510, 520, and 530 to re-search the articles identified in the first search result set. Based on the re-search, the article identifiers in the first search result set are ranked or ordered wherein those article identifiers for articles about the Simpsons television series are placed above articles about other animation series in the first search result set, which is now personalized. Alternatively, the re-search provides a filter whereby only those article identifiers for articles about the Simpsons television series are returned in a personalized search result set.

In another embodiment, the search engine 158 can use the added query phrase(s) and/or term(s) to affect the searching methodology by expanding the input query at 415 and narrow the search to only articles that include the added query phrase(s) and/or term(s) in accordance with any query expansion technique known in the field of information retrieval. For example, the user 112*a* again submits an input query "animation" at 415 chosen to be personalized based on The Simpsons community. The search engine 158 then uses the added phrase(s) and/or term(s) obtained from The Simpsons community to expand the input query "animation" to include "Simpsons" and either "Krusty" or "Matt Groening". The search engine 158 then locates articles from the network 106, by searching the article index in memory 156 or another data storage device as mentioned earlier, that are relevant to the expanded input query, e.g., those articles that are relevant to the Simpsons television series and not to other animation series, to be included in the search result set.

At 760, the search engine 158 returns the search result set to the user 112*a*, wherein the search result set can be provided in The Simpsons community 400 or in a display provided by the search engine 158.

The methods depicted in FIGS. 6 and 7 have been described wherein a member of a social network can personalize a search at a search engine through explicit personalization choices. For example, the method depicted in FIG. 6 allows a member to personalize a search by explicitly choosing the association(s) in the social network on which the search is to be based; whereas, the method depicted in FIG. 7 allows a member to personalize a search by explicitly initiating the search within an association in the social network on which the member wishes the search to be based. According to embodiments of the invention, e.g., as shown in FIG. 8, a member can personalize a search implicitly, wherein personalization choices can be inferred from the member's gathered personalization information.

Referring now to the method depicted in FIG. 8, wherein a search can be implicitly personalized based on a member's personalization information, as obtained from the member's profile, profiles of other associated members, and/or cookies embedded with the member. This method begins at 810 with a user, such as user 112*a*, joining a social network, such as the social network 200 (e.g., Orkut™), by creating a user or member profile, as described earlier.

At 820, the created member profile is linked to a search engine, such as the search engine 158 at the search site 152. In one embodiment, the social network engine 168 provides the created member profile with a search tool similar to the search tool 300 shown in FIG. 3, but without the community listing 320, for linkage to the search engine 158. However, the member is still able to select a generic or personalized search with the search tool by: 1) simply choosing a generic or personalized search, e.g., by clicking on a button provided in the search tool; or 2) choosing one of the available levels of personalization for the search, e.g., via a scale slider as described earlier.

At 830, as a member of the social network, the user 112*a* can access his or her member profile and the search tool therein to gain access to the search engine 158 for a personalized search.

At 840, the user 112*a* submits an input query and selects to personalize the search in the search tool.

At 850, in response to receiving the input query from the search tool, the search engine 158 searches the social network database 170 by communicating with the server device 162 and its social network engine 168 to look up the member profile of the user 112*a*, one or more profiles of other members associated with the user 112*a*, and/or cookies stored at the user's 112*a* side and gather implicit personalization choices from the member profile. In one embodiment, association information in the member profile can be used to implicitly personalize the search. For example, the user 112*a* submits the input query, "animation," and the association information in the member profile of the user 112*a* indicates that he or she belongs to The Simpsons community; therefore, a search for "animation" can be conducted based on The Simpsons community. In another example, with same input query, "animation," the association information in the member profile indicates that the user 112*a* belongs to both The Simpsons community and the Computer Science community; therefore, a search for "animation" can be based on both communities to search for not only articles that discuss about The Simpsons television series but also, e.g., software relating to "The Simpsons." As described earlier, the search engine 158 can use added query phrase(s) and/or term(s) from the based community or communities to affect the searching methodology or ranking of the search results that are returned to the user 112*a*.

In another embodiment, membership information in the member profile or member's cookies, such as the member's activities in the social network or the member's consumer information, can be used to implicitly personalize the search. For example, with the same input query, "animation," the membership information in the member profile of the user 112*a* indicates that he or she has purchased items from Amazon.com in the past; therefore, a search for "animation" can be conducted with a focus on animation-related items that can be purchased from Amazon.com. In another example, with the same input query, "animation," the membership information of the user 112*a* indicates that he or she has frequently accessed The Simpsons community to read postings therein, or that other members in the social network with whom the user 112*a* is associated in one way or another are members of the Simpsons community, even though the user 112*a* may or may not a member of such community; nevertheless, a search for "animation" can be conducted based on The Simpsons community.

At 860, the search engine 158 conducts a personalized search of the input query received from the search tool, using the article index stored in memory 156 or another data storage device as mentioned earlier, based on the implicit personalization choices. In one embodiment, the search engine 158 first conducts a normal search of the input query and returns a first search result set of article identifiers. Next, added query phrase(s), term(s), and/or preferred site(s) as obtained from the implicit personalization choices can be used to re-search the underlying articles represented by the article identifiers in the first search result set to determine the relevancy of each article to the community included in the personalization choice. Based on the relevancy of the articles after the re-search, the article identifiers in the first search result set are ranked, ordered, or filtered and returned to the user 112*a* in a similar manner as described in FIG. 6 at 670 or FIG. 7 at 750.

At 870, the search engine 158 returns the personalized search result set to the user 112*a*, wherein the search result set can be provided in the search tool within the member profile or a display provided by the search engine 158.

From the aforementioned embodiments and examples as depicted and described with reference to FIGS. 6-8, and the totality of the present disclosure, one skilled in the art should realize that all kinds of personalization information that is associated with a member can be used to (implicitly or explicitly) personalize a search and that the kind(s) of personalization information to be used for personalizing searches merely depends on the desired programming of the search engine 158 and/or the level of personalization desired by the searching member/user. Further, as mentioned earlier, the degree of use of personalization information (e.g., the use of community, communities, classification, or classifications) may vary; for example, the degree of use of communities for personalized search may vary depending on how often or how much the user participates or has participated in each community.

According to another embodiment of the present invention, search personalization can be performed directly from the search engine 158, i.e., outside the social network environment provided by the social network engine 168, so long as the search engine 158 is linked with the social network engine 168. For example, the search engine 158 can provide users with a search tool that includes an option to link the search to a social network engine, such as the social network engine 168, for search personalization. Should the user wishes to exercise such linking option, the user can be provided with the same embodiments of search personalization as described earlier.

Accordingly, members of a social network can add a layer of personalization on top of the regular searches performed by a search engine. Search personalization can be implicit or explicit, and it can improve the searching experience a user has with a search engine. For example, a first member of the Apple Computer community in a social network and a second member of the CarTalk community in the same social network may submit the same search query, "Jaguar," to a search engine; however, through search personalization, the search engine understands that the first member may be looking for a Jaguar operating system and the second member may be looking for a Jaguar car, and it can tailor the searches for the two members accordingly.

The methods depicted in FIGS. 6-8 have been described wherein the search engine 158 locate articles relevant to the original search queries or personalized search queries from a general article index stored in the memory 156 or any other suitable data storage device. According to another embodiment of the present invention, such general article index can be obtained first. Then, a personalized article index for each user/member of a social network can be derived and maintained, wherein each personalized article index is the general article index with index scores reflecting the personalization biasing as based on personalization choices (implicit or explicit).

Thus far, embodiments of the present invention have been described with reference to personalizing search queries and/or search results for article searches. However, it should be understood by those in the art, based on the present disclosure, that search queries and/or search results can be personalized to provide users with not just recommended articles but also other members, or their member profiles, in the social network that the users can meet or with whom they want to be associated.

General

Although the invention has been described with reference to these embodiments, other embodiments could be made by those in the art to achieve the same or similar results. Variations and modifications of the present invention will be apparent to one skilled in the art based on the present disclosure, and the present invention encompasses all such modifications and equivalents.

The invention claimed is:

1. A computer-implemented method of providing a search result set relevant to a search query, the method comprising:
   hosting a social network comprising a plurality of communities, each community having a plurality of users;
   storing a user profile for each user including a first user and a second user, the user profile identifying the user's membership in at least one of the communities;
   receiving the search query directed to a content index that is independent of the social network from the first user who is a member of at least one of the communities;
   determining personalization information including a first search term and a second search term, the first search term being determined from the first user's user profile and data from the second user's user profile, the second user's user profile having a degree of separation from the first user's user profile in the social network, and the second search term being based at least in part on the first user's membership in the at least one of the communities and a level of personalization selected by the first user for personalizing the search query received from the first user, wherein the level of personalization indicates a total number of the communities from which the second search term is retrieved;
   combining the search query received from the first user and the first and second search terms to form a personalized search query; and
   searching the content index using the personalized search query to produce the search result set comprising documents relevant to the personalized search query.

2. The method of claim 1, wherein determining personalization information including the second search term further comprises identifying a classification of the at least one community.

3. The method of claim 1, wherein the data from the second user's user profile is further based on a type-specific degree of separation between the first user and the second user.

4. The method of claim 1, wherein the data from the second user's user profile is further based on a type of social relationship between the first user and the second user.

5. The method of claim 1, wherein determining personalization information including the first search term further comprises identifying a history of user web page access.

6. The method of claim 1, wherein determining personalization information including the first search term comprises identifying information explicitly provided by the first user for personalizing the search query.

7. The method of claim 6, wherein information explicitly provided by the first user for personalizing the search query comprises a user-defined level of personalization for the search query.

8. The method of claim 7, wherein the user-defined level of personalization comprises an indication of a subset of communities that the first user is associated with that are to be used for determining the second search term personalized search.

9. The method of claim 1, further comprising ranking the search result set based on the personalization information.

10. The method of claim 1, wherein determining personalization information including the first search term and the second search term further comprises identifying a search term explicitly defined by the at least one community.

11. The method of claim 10, wherein the search term explicitly defined by the at least one community is defined by an owner of the at least one community.

12. The method of claim 10, wherein the search term explicitly defined by the at least one community is defined by the members of the at least one community.

13. The method of claim 12, wherein the search term explicitly defined by the members of the at least one community is defined responsive to votes provided by the members of the at least one community.

14. The method of claim 12, wherein the search term explicitly defined by the members of the at least one community is defined responsive to ratings provided by the members of the at least one community.

15. The method of claim 12, wherein the search term explicitly defined by the members of the at least one community is defined responsive to member feedback based on relevancy of search results.

16. The method of claim 15, wherein the member feedback based on relevancy of search results is comprised by member click-through rates of search results.

17. A computer implemented method of providing search results relevant to a search query of a first user, the first user being a member of at least one community in a social network comprising a plurality of communities, each community having a plurality of users, each user including the first user and a second user associated with a user profile identifying the user's membership in at least one of the communities, the method comprising:
- receiving the search query directed to a content index that is independent of the social network from the first user who is a member of at least one of the communities;
- using one or more processors to determine personalization information including a first search term and a second search term, the first search term being determined from the first user's user profile and data from the second user's user profile, the second user's user profile having a degree of separation from the first user's user profile in the social network, and the second search term being based at least in part on the first user's membership in the at least one of the communities and a level of personalization selected by the first user for personalizing the search query received from the first user, wherein the level of personalization indicates a total number of the communities from which the second search term is retrieved; and
- using the one or more processors to combine the search query received from the first user and the first and second search terms to form a personalized search query.

18. A computer system for providing a set of search results relevant to a search query of a first user, the first user being a member of at least one community in a social network comprising a plurality of communities, each community having a plurality of users, each user including the first user and a second user associated with a user profile identifying the user's membership in at least one of the communities, the system comprising:
- a memory;
- one or more processors;
- a relational database of records stored in the memory, the relational database of records comprising the plurality of communities, a plurality of user profiles and relationships between the user profiles and the plurality of communities;
- a query-receiving module stored in the memory and executable by the one or more processors to receive, from the first user, the search query directed to a content index that is independent of the social network, wherein the first user has a user profile in the relational database and the second user has a user profile in the relational database;
- a module stored in the memory and executable by the one or more processors to determine personalization information including a first search term and a second search term, the first search term being determined from the first user's user profile and data from the second user's user profile, the second user's user profile having a degree of separation from the first user's user profile in the social network, and the second search term being based at least in part on the first user's membership in the at least one of the communities and a level of personalization selected by the first user for personalizing the search query received from the first user, wherein the level of personalization indicates a total number of the communities from which the second search term is retrieved, the module for determining personalization information configured to communicate with the relational database;
- a query building module stored in the memory and executable by the one or more processors to combine the search query received from the first user and the first and second search terms to form a personalized search query, the query building module configured to communicate with the query receiving module and the module for determining personalization information;
- a search module stored in the memory and executable by the one or more processors to search the content index that is independent of the social network using the personalized search query to produce the set of search results relevant to the personalized search query, the search module in communication with the query building module; and
- a search display module stored in the memory and executable by the one or more processors to provide the set of search results to the first user, the search display module in communication with the search module.

19. A computer system of providing search results relevant to a search query of a first user, the first user being a member of at least one community in a social network comprising a plurality of communities, each community having a plurality of users, each user including the first user and a second user associated with a user profile identifying the user's membership in at least one of the communities, the system comprising:
- a memory;
- one or more processors;
- a query receiving module stored in the memory and executable by the one or more processors to receive the search query directed to a content index that is independent of the social network from the first user who is a member of at least one of the communities;
- a module stored in the memory and executable by the one or more processors to determine personalization information including a first search term and a second search term, the first search term being determined from the first user's user profile and data from the second user's user profile, the second user's user profile having a degree of separation from the first user's user profile in the social network, and the second search term being based at least in part on the first user's membership in the at least one of the communities and a level of personalization selected by the first user for personalizing the search query received from the first user, wherein the level of personalization indicates a total number of the communities from which the second search term is retrieved; and
- a query building module stored in the memory and executable by the one or more processors to combine the search query received from the first user and the first and second search terms to form a personalized search query, the query building module configured to communicate with the query receiving module and the module for determining personalization information.

20. A computer-implemented method of providing a search result set relevant to a search query, the method comprising:
- hosting a social network comprising a plurality of communities, each community having a plurality of users;
- storing a user profile for each user including a first user and a second user, the user profile identifying the user's membership in at least one of the communities;
- receiving the search query directed to a content index that is independent of the social network from the first user who is a member of at least one of the communities;
- determining personalization information including a first search phrase and a second search phrase, the first search phrase being determined from the first user's user profile and data from the second user's user profile, the second user's user profile having a degree of separation from the first user's user profile in the social network, and the second search phrase being based at least in part on the first user's membership in the at least one of the communities and a level of personalization selected by the first user for personalizing the search query received from the first user, wherein the level of personalization indicates a total number of the communities from which the second search phrase is retrieved;

combining the search query received from the first user and the first search phrase and the second search phrase to form a personalized search query; and searching the content index using the personalized search query to produce the search result set comprising documents relevant to the personalized search query.

21. The method of claim 20, wherein determining personalization information including the first search phrase further comprises identifying a classification of the at least one community.

22. The method of claim 20, wherein data from the second user's user profile is further based on a type-specific degree of separation between the first user and the second user.

23. The method of claim 20, wherein data from the second user's user profile is further based on a type of social relationship between the first user and the second user.

24. The method of claim 20, wherein determining personalization information including the first search phrase further comprises identifying a history of user web page access.

25. The method of claim 20, wherein determining personalization information including the first search phrase comprises identifying information explicitly provided by the first user for personalizing the search query.

26. The method of claim 25, wherein the information explicitly provided by the first user for personalizing the search query comprises a user-defined level of personalization for the search query.

27. The method of claim 26, wherein the user-defined level of personalization comprises an indication of a subset of communities that the first user is associated with that are to be used for determining the second search term.

28. The method of claim 20, further comprising ranking the search result set based on the personalization information.

29. The method of claim 20, wherein determining personalization information including the first search phrase and the second search phrase further comprises identifying a search phrase explicitly defined by the at least one community.

30. The method of claim 29, wherein the search phrase explicitly defined by the at least one community is defined by an owner of the at least one community.

31. The method of claim 29, wherein the search phrase explicitly defined by the at least one community is defined by the members of the at least one community.

32. The method of claim 31, wherein the search phrase explicitly defined by the members of the at least one community is defined responsive to votes provided by the members of the at least one community.

33. The method of claim 32, wherein the search phrase explicitly defined by the members of the at least one community is defined responsive to ratings provided by the members of the at least one community.

34. The method of claim 32, wherein the search phrase explicitly defined by the members of the at least one community is defined responsive to member feedback based on relevancy of search results.

35. The method of claim 34, wherein the member feedback based on relevancy of search results is comprised by member click-through rates of search results.

36. A computer-implemented method of providing search results relevant to a search query of a first user, the first user being a member of at least one community in a social network comprising a plurality of communities, each community having a plurality of users, each user including the first user and a second user associated with a user profile identifying the user's membership in at least one of the communities, the method executed by a computer and comprising:

receiving the search query directed to a content index that is independent of the social network from the first user who is a member of at least one of the communities;

using one or more processors to determine personalization information including a first search phrase and a second search phrase, the first search phrase being determined from the first user's user profile and data from the second user's user profile, the second user's user profile having a degree of separation from the first user's user profile in the social network, and the second search phrase being based at least in part on the first user's membership in the at least one of the communities and a level of personalization selected by the first user for personalizing the search query received from the first user, wherein the level of personalization indicates a total number of the communities from which the second search phrase is retrieved; and using the one or more processors to combine the search query received from the first user and the first and second search phrases to form a personalized search query.

37. A computer system for providing a set of search results relevant to a search query of a first user, the first user being a member of at least one community in a social network comprising a plurality of communities, each community having a plurality of users, each user including the first user and a second user associated with a user profile identifying the user's membership in at least one of the communities, the system comprising:

a memory;

one or more processors;

a relational database of records stored in the memory, the relational database of records comprising the plurality of communities, a plurality of user profiles and relationships between the user profiles and the plurality of communities;

a query-receiving module stored in the memory and executable by the one or more processors to receive, from the first user, the search query directed to a content index that is independent of the social network, wherein the first user has a user profile in the relational database and the second user has a user profile in the relational database;

a module stored in the memory and executable by the one or more processors to determine personalization information including a first search phrase and a second search phrase, the first search phrase being determined from the first user's profile and data from the second user's user profile, the second user's user profile having a degree of separation from the first user's user profile in the social network, and the second search phrase being based at least in part on the first user's membership in the at least one of the communities and a level of personalization selected by the first user for personalizing the search query received from the first user, wherein the level of personalization indicates a total number of the communities from which the second search phrase is retrieved, the module for determining personalization information configured to communicate with the relational database;

a query building module stored in the memory and executable by the one or more processors to combine the search query received from the first user and the first and second search phrases to form a personalized search query, the query building module configured to communicate with the query receiving module and the module for determining personalization information;

a search module stored in the memory and executable by the one or more processors to search the content index that is independent of the social network using the personalized search query to produce the set of search results relevant to the personalized search query, the search module in communication with the query building module; and a search display module stored in the memory and executable by the one or more processors to provide the set of search results to the first user, the search display module in communication with the search module.

38. A computer system of providing search results relevant to a search query of a first user, the first user being a member of at least one community in a social network comprising a plurality of communities, each community having a plurality of users, each user including the first user and a second user associated with a user profile identifying the user's membership in at least one of the communities, the system comprising:

a memory;

one or more processors;

a query receiving module stored in the memory and executable by the one or more processors to receive the search query directed to a content index that is independent of the social network from the first user who is a member of at least one of the communities;

a module stored in the memory and executable by the one or more processors to determine personalization information including a first search phrase and a second search phrase, the first search phrase being determined from the first user's user profile and data from the second user's user profile, the second user's user profile having a degree of separation from the first user's user profile in the social network, and the second search phrase being based at least in part on the first user's membership in the at least one of the communities and a level of personalization selected by the first user for personalizing the search query received from the first user, wherein the level of personalization indicates a total number of the communities from which the second search phrase is retrieved; and a query building module stored in the memory and executable by the processor to combine the search query received from the first user and the first and second search phrases to form a personalized search query, the query building module configured to communicate with the query receiving module and the module for determining the personalization information.

* * * * *